E. A. IVATTS.
ELECTRIC STENCIL CUTTING MACHINE.
APPLICATION FILED MAR. 16, 1910.

1,034,620.

Patented Aug. 6, 1912.

Witnesses

Inventor

UNITED STATES PATENT OFFICE.

ERNEST ALBERT IVATTS, OF PARIS, FRANCE, ASSIGNOR TO COMPAGNIE GENERALE DE PHONOGRAPHES, CINEMATOGRAPHES ET APPAREILS DE PRECISION, OF PARIS, FRANCE.

ELECTRIC STENCIL-CUTTING MACHINE.

1,034,620. Specification of Letters Patent. Patented Aug. 6, 1912.

Application filed March 16, 1910. Serial No. 549,602.

*To all whom it may concern:*

Be it known that I, ERNEST ALBERT IVATTS, citizen of Great Britain, residing at Paris, in the Department of the Seine and Republic of France, have invented certain new and useful Improvements in Electric Stencil-Cutting Machines, of which the following is a specification.

The present invention refers to an electric machine for cutting out stencil bands used for coloring the pictures for kinematographic films, this machine being based on the principle that, in order to produce a very rapid to and fro movement of the armature of an electromagnet, an alternate current is passed into the coils.

Figure 1:
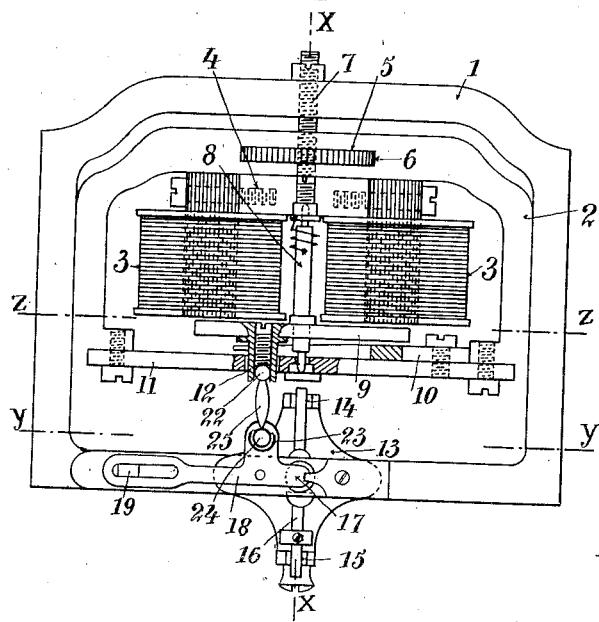
Figure 2:
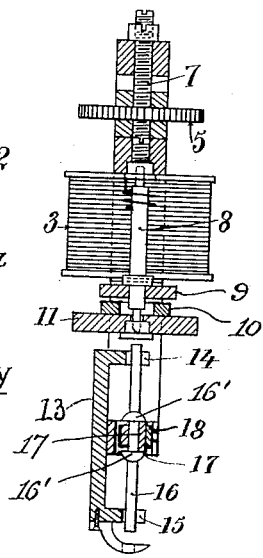
Figure 3:
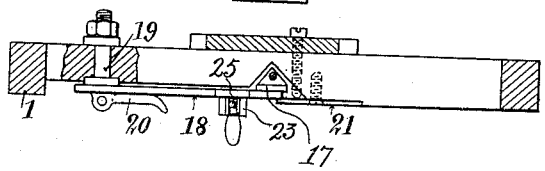
Figure 4:
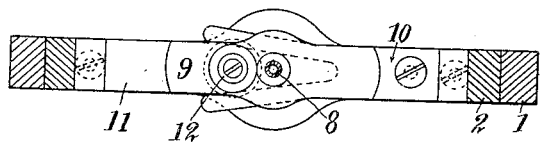

I shall now describe this invention with reference to the accompanying drawing, in which:

Figure 1 is a front elevation. Fig. 2 is a section on the line X—X of Fig. 1. Fig. 3 is a section on the line Y—Y of Fig. 1. Fig. 4 is a section on the line Z—Z of Fig. 1.

This electric machine for cutting out consists of a metal frame 1 of such shape as to permit of easy manipulation. A second frame 2, carrying the electromagnets 3, which are fastened to it by their yoke 4 can slide within the interior of the frame 1. A milled button 5, that can be turned by hand in a slot 6 where it is situated is mounted on a fixed screw 7 and permits of raising or lowering as desired this frame 2 within the interior of the outer frame 1.

A spindle 8 has mounted on it a plate or soft iron armature 9 and is pivotally supported in an upright position between the coils 3 of the electromagnet, but without any vertical play. The axis of said spindle is in line with the axis of reciprocation of the tool hereinafter described. The armature 9 can oscillate horizontally across and at a slight distance from the poles of the coils 3, but without touching them. The oscillation of this armature 9 is obtained in the following manner: The armature being deviated at a certain angle with the line passing through the poles of the magnets 3, then if the current is switched on to the said poles, a strong attraction will be manifested at each end of the armature 9, which will tend rapidly to return the latter parallel to the line of the poles; owing to the velocity acquired the ends of the said armature pass beyond this line and arrange themselves parallel to it after a certain number of oscillations. In order to assist these oscillations a spring 10 with two branches like a tuning fork is screwed flat on to the cross bar 11 of the frame 2. A tube 12 riveted to one of the branches of the armature 9 strikes against one or the other branch of the spring 10 and rebounds backward and forward. The oscillation of this tube 12 is rendered possible by a notch formed in the cross bar 11. When at rest the armature 9 is biased against one of the branches of the spring 10 by any suitable means provided for this purpose, such as a small spring coiled around the spindle 8; this position of the armature corresponding to the lifting up of the drill or cutting point, whereas the position parallel to the line of the poles corresponds to the maximum descent of this said drill, as hereinafter described.

All the parts described above are rigidly mounted on the frame 2 and constitute an electric vibrator oscillating a hundred times per second for an alternating current of fifty periods passing through the electromagnet.

A rectangular plate 13 is fastened behind the exterior frame 1 and the vertical extremities of the same are notched in the form of a V at 14 and 15. The drill or tool holder 16 is situated and slides in these notches. This holder 16 is provided in its middle part with two cheeks or collars 16' forming abutments with which engages a hard steel button 17, riveted at one end of a lever 18, the other end of which can slide from right to left on an axle 19. The button transmits the movement of the lever to the tool holder and is made of hard steel to insure its durability. A latch 20 with eccentric tightening device, rigidly connects up the axle 19 and the lever 18 when the apparatus is working. A plate 21 rests with slight friction with its front portion on the end of the lever 18 and assures the actuating of the tool holder 16 by means of the button 17, as well as the vertical direction of the latter by being pressed to the bottom of the V shaped notches 14 and 15.

As has been stated above with an alternating current of fifty periods per second for example, a hundred oscillations of the armature 9 can be obtained by means of the parts rigidly fitted to the interior frame 2. In order to transmit these oscillations, and at the same time doubling their number, to the tool holder 16, the following mechanical arrangement is provided: A metal ball 22 is held within the tube 12 and another similar ball 24 is held in another tube 23 riveted to the upper lug of the lever 18. A small very light connecting rod 25 connects these two balls and forms the essential transmitting and multiplying part of the vibrations of the armature 9.

*Method of working.*—In the position shown in Fig. 1, the apparatus is in piercing position, the armature being parallel to the line of the poles and the tool holder being situated at its lowest point. If one of the ends of the armature 9 is pressed on in any manner, it will deviate on each side of the said lines and oscillate on its spindle 8, and the end of the armature carrying the tube 12 passes in front of the plane of the lever 18 and consequently is removed farther from the tube 23. The connecting rod 25 connecting the two balls 22 and 24 being inextensible the lever and the tool holder will be raised up owing to the pull on the rod due to its oblique position. For an entire vibration of the armature 9, the extremities of the latter pass twice in the plane of the line of the poles, which consequently produces for each vibration two lowerings of the tool holder 16, thus resulting for a current of fifty periods per second in two hundred strokes of the tool holder. By an entire vibration is meant an oscillation from its normal position of rest across the plane of the poles to its opposite position and then back to its original position. There will be a complete vibration of this kind at each wave of the current, and therefore two such vibrations for every cycle of current. Each time the armature passes the plane of the poles it pushes down the tool, which produces two hundred strokes of said tool per second with a current having a frequency of fifty.

For cutting out stencil bands, the tool will be in the form of a steel point and by the combination of the vibratory movement of the tool and the feeding or the displacement of the surface to be cut out, perforations will be obtained so close to each other that a very sharp and very thorough cutting out will be obtained.

By regulating the milled button the distance between the rigid system of the interior frame 2 and that of the frame 1 can be varied, for the purpose of varying the amplitude of the vibrations of the tool holder.

It is evident that modifications may be introduced in this electric machine for cutting out stencil bands as well as improvements in details.

The parts may be constructed of any suitable material according to requirements.

Claims:

1. The combination with a reciprocating tool, of an electromagnet, an armature oscillating across the pole faces of said electromagnet in a plane transverse to the line of movement of said tool and on an axis in line with that of said tool, and connecting mechanism for causing said armature to actuate said tool.

2. The combination with a reciprocating tool holder, of an electromagnet, an armature oscillating across the pole faces of said electromagnet in a plane transverse to the line of movement of said tool holder and on an axis in line with that of said tool, a lever engaging with said tool holder, and connections between said armature and said lever.

3. The combination with a reciprocating tool holder, of a lever engaging with said holder and vibrating in the plane of said holder, an electromagnet, an armature pivoted on an axis in line with that of the tool holder and oscillating transverse to the plane in which said lever moves, and to opposite sides thereof and across the pole faces of said electromagnet and mechanism connecting said lever and said armature.

4. The combination with a reciprocating tool holder, of a lever engaging therewith and vibrating in the plane of said holder, an electromagnet, an armature pivoted on an axis in line with that of the tool holder and oscillating transverse to the plane in which said lever moves and to opposite sides thereof and across the pole faces of said electromagnet and a rigid rod connecting said armature and lever and imparting to said tool a working stroke for each oscillation of said armature.

5. The combination with a reciprocating tool holder, of an electromagnet, an armature therefor mounted on a shaft whose axis is in line with that of said tool holder, means for adjusting said electromagnet along said axis, and operative connections between said armature and tool holder.

6. The combination with an electromagnet, of an oscillating armature therefor, a forked spring between whose arms said armature can vibrate, a reciprocating tool holder, and operative connections between said armature and holder.

In testimony whereof I affix my signature in presence of two witnesses.

ERNEST ALBERT IVATTS.

Witnesses:
 HENRY DANZER,
 LUCIEN CRESPING.